(12) United States Patent
Tsukamoto et al.

(10) Patent No.: US 10,902,857 B2
(45) Date of Patent: Jan. 26, 2021

(54) ONBOARD CONTROL DEVICE, CONTROL DEVICE, CONTROL METHOD, COMPUTER-READABLE STORAGE MEDIUM, AND METHOD OF RESPONDING TO UTTERANCE

(71) Applicant: Toyota Jidosha Kabushiki Kaisha, Toyota (JP)

(72) Inventors: Masaki Tsukamoto, Toyota (JP); Jun Ikeda, Nagoya (JP); Hideo Hasegawa, Nagoya (JP); Yukiya Yamane, Koto-ku (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 157 days.

(21) Appl. No.: 16/222,128

(22) Filed: Dec. 17, 2018

(65) Prior Publication Data

US 2019/0189131 A1  Jun. 20, 2019

(30) Foreign Application Priority Data

Dec. 20, 2017 (JP) ................................ 2017-243726

(51) Int. Cl.
| | |
|---|---|
| *G10L 17/22* | (2013.01) |
| *G06F 3/14* | (2006.01) |
| *G06F 3/16* | (2006.01) |
| *G09G 5/30* | (2006.01) |
| *G10L 17/00* | (2013.01) |

(52) U.S. Cl.
CPC ................ *G10L 17/22* (2013.01); *G06F 3/14* (2013.01); *G06F 3/1423* (2013.01); *G06F 3/165* (2013.01); *G06F 3/167* (2013.01); *G09G 5/30* (2013.01); *G10L 17/00* (2013.01); *G09G 2358/00* (2013.01); *G09G 2360/04* (2013.01); *G09G 2370/04* (2013.01); *G09G 2380/10* (2013.01)

(58) Field of Classification Search
CPC ......... G10L 17/22; G10L 17/005; G06F 3/14; G06F 3/165; G06F 3/1423; G06F 3/167; G09G 5/30; G06Q 10/06
USPC ...... 704/235, 246, 275, 270; 701/36; 703/20
See application file for complete search history.

(56) References Cited

U.S. PATENT DOCUMENTS

| | | | |
|---|---|---|---|
| 8,781,838 B2 * | 7/2014 | Krause .................... | G10L 13/00 704/270 |
| 2007/0265890 A1 * | 11/2007 | Curtis .................... | G06Q 10/06 705/5 |
| 2007/0294073 A1 * | 12/2007 | Okamoto ............... | B60K 35/00 703/20 |

(Continued)

*Primary Examiner* — MD S Elahee
(74) *Attorney, Agent, or Firm* — Dinsmore & Shohl LLP

(57) ABSTRACT

An onboard control device includes: a deriving section that, on the basis of information that is an object of outputting, derives a conveying degree that expresses an extent to which it is desired to convey the information that is the object of outputting to each of plural occupants who exist within a vehicle; a selecting section that, in accordance with the conveying degrees of each of the vehicle occupants that have been derived by the deriving section, selects an outputting device that is to output the information that is the object of outputting, from among plural outputting devices that exist within the vehicle; and a control section that carries out control for causing the information, which is the object of outputting, to be outputted from the outputting device selected by the selecting section.

7 Claims, 7 Drawing Sheets

| OUTPUT DESTINATION \ VEHICLE OCCUPANT | VEHICLE OCCUPANT D | VEHICLE OCCUPANT P | VEHICLE OCCUPANT A | VEHICLE OCCUPANT B | VEHICLE OCCUPANT C |
|---|---|---|---|---|---|
| DISPLAY 1 | 4.0 | 2.0 | 1.0 | 1.0 | 1.0 |
| DISPLAY 2 | 2.0 | 4.0 | 1.0 | 1.0 | 1.0 |
| DISPLAY 3 | 3.0 | 3.0 | 1.0 | 2.0 | 1.0 |
| SPEAKER | 4.0 | 4.0 | 3.0 | 3.0 | 3.0 |
| PORTABLE TERMINAL 1 | 4.0 | 1.0 | 1.0 | 1.0 | 1.0 |
| PORTABLE TERMINAL 2 | 1.0 | 4.0 | 1.0 | 1.0 | 1.0 |
| DISPLAY 4 | 1.0 | 1.0 | 4.0 | 4.0 | 3.0 |
| DISPLAY 5 | 1.0 | 1.0 | 3.0 | 4.0 | 4.0 |

42

(56) References Cited

U.S. PATENT DOCUMENTS

2016/0059864 A1\* 3/2016 Feit .................... H04M 1/6075
                                                              701/36
2016/0180853 A1    6/2016 VanLund et al.
2017/0083285 A1    3/2017 Meyers et al.

\* cited by examiner

FIG.3

| CONVEYING DEGREE | THRESHOLD VALUE |
|---|---|
| DEFINITELY CONVEY (DEFINITELY WANT TO CONVEY) | 4.0 |
| CONVEY (WANT TO CONVEY) | 3.0 |
| DIFFICULT TO CONVEY (DO NOT PARTICULARLY WANT TO CONVEY) | 2.0 |
| DO NOT CONVEY (DO NOT WANT TO CONVEY) | 1.0 |

FIG.4

| OUTPUT DESTINATION \ VEHICLE OCCUPANT | VEHICLE OCCUPANT D | VEHICLE OCCUPANT P | VEHICLE OCCUPANT A | VEHICLE OCCUPANT B | VEHICLE OCCUPANT C |
|---|---|---|---|---|---|
| DISPLAY 1 | 4.0 | 2.0 | 1.0 | 1.0 | 1.0 |
| DISPLAY 2 | 2.0 | 4.0 | 1.0 | 1.0 | 1.0 |
| DISPLAY 3 | 3.0 | 3.0 | 1.0 | 2.0 | 1.0 |
| SPEAKER | 4.0 | 4.0 | 3.0 | 3.0 | 3.0 |
| PORTABLE TERMINAL 1 | 4.0 | 1.0 | 1.0 | 1.0 | 1.0 |
| PORTABLE TERMINAL 2 | 1.0 | 4.0 | 1.0 | 1.0 | 1.0 |
| DISPLAY 4 | 1.0 | 1.0 | 4.0 | 4.0 | 3.0 |
| DISPLAY 5 | 1.0 | 1.0 | 3.0 | 4.0 | 4.0 |

| OUTPUT DESTINATION \ VEHICLE OCCUPANT | VEHICLE OCCUPANT D | VEHICLE OCCUPANT P | VEHICLE OCCUPANT A | VEHICLE OCCUPANT B | VEHICLE OCCUPANT C |
|---|---|---|---|---|---|
| DISPLAY 1 - LARGE CHARACTERS | 4.0 | 2.0 | 1.0 | 1.0 | 1.0 |
| DISPLAY 1 - SMALL CHARACTERS | 3.0 | 1.0 | 1.0 | 1.0 | 1.0 |
| DISPLAY 2 - LARGE CHARACTERS | 2.0 | 4.0 | 1.0 | 1.0 | 1.0 |
| DISPLAY 2 - SMALL CHARACTERS | 1.0 | 3.0 | 1.0 | 1.0 | 1.0 |
| DISPLAY 3 - LARGE CHARACTERS | 3.0 | 3.0 | 1.0 | 2.0 | 1.0 |
| DISPLAY 3 - SMALL CHARACTERS | 2.0 | 2.0 | 1.0 | 1.0 | 1.0 |
| SPEAKER - HIGH VOLUME | 4.0 | 4.0 | 3.0 | 3.0 | 3.0 |
| SPEAKER - LOW VOLUME | 3.0 | 3.0 | 2.0 | 2.0 | 2.0 |
| ... | ... | ... | ... | ... | ... |

# ONBOARD CONTROL DEVICE, CONTROL DEVICE, CONTROL METHOD, COMPUTER-READABLE STORAGE MEDIUM, AND METHOD OF RESPONDING TO UTTERANCE

CROSS-REFERENCE TO RELATED APPLICATION

This application is based on and claims priority under 35 USC 119 from Japanese Patent Application No. 2017-243726 filed on Dec. 20, 2017 the disclosure of which is incorporated by reference herein.

BACKGROUND

Technical Field

The present disclosure relates to an onboard control device, a control device, a control method, a computer-readable medium storing a control program and a method of responding to an utterance.

Related Art

U.S. Patent Application Publication No. 2016/180853 (Patent Document 1) discloses a voice system having a voice outputting device that is set within a facility that a user secures. In this voice system, the voice outputting device plays-back plural audio contents such as music and audio books and the like.

Further, U.S. Patent Application Publication No. 2017/083285 (Patent Document 2) discloses a technique of selecting, from plural devices, a device that outputs a response to an utterance of a user.

By the way, in a case in which plural persons exist within a predetermined region such as within a vehicle or the like, when information is outputted from an outputting device that outputs information such as a display device or a voice outputting device or the like, there is the problem that the information is conveyed also to persons to which it is not desired to convey the information. However, this problem is not considered in the techniques of Patent Document 1 and Patent Document 2.

SUMMARY

The present disclosure was made in consideration of the above-described circumstances, and an object thereof is to convey information to the right person.

A first aspect includes: a deriving section that, on the basis of information that is an object of outputting, derives a conveying degree that expresses an extent to which it is desired to convey the information that is the object of outputting to each of plural vehicle occupants who exist within a vehicle; a selecting section that, in accordance with the conveying degrees of each of the vehicle occupants that have been derived by the deriving section, selects an outputting device that is to output the information that is the object of outputting, from among plural outputting devices that exist within the vehicle; and a control section that carries out control for causing the information, which is the object of outputting, to be outputted from the outputting device selected by the selecting section.

In accordance with the first aspect, on the basis of information that is the object of outputting, conveying degrees, which express extents to which it is desired to convey the information that is the object of outputting to the respective plural vehicle occupants existing within the vehicle, are derived. The outputting device, which corresponds to the derived conveying degrees per vehicle occupant, is selected from among the plural outputting devices that exist within the vehicle. Then, the information that is the object of outputting is outputted from the selected outputting device. Accordingly, information can be conveyed to the appropriate person.

Note that the second aspect is the first aspect that further includes a generating section that, on the basis of positional relationships between the respective plural outputting devices and the respective plural vehicle occupants, generates information that associates a conveying degree, which expresses ease of conveying information, with each combination of the respective plural outputting devices and the respective plural vehicle occupants, wherein the selecting section selects the outputting device by using the information generated by the generating section and the conveying degrees of information for each of the plural vehicle occupants that were derived by the deriving section.

In accordance with the second aspect, the outputting device is selected by using degrees of conveying of information to the respective plural vehicle occupants, and information that associates conveying degrees, which express the ease of conveying information, with respective combinations of the respective plural outputting devices and the respective plural vehicle occupants. Accordingly, information can be conveyed to a more suitable person.

Further, in a third aspect, in the second aspect, the outputting device is at least one of a voice outputting device that is installed in the vehicle, a display device that is installed in the vehicle, and a portable terminal that a vehicle occupant of the vehicle possesses.

In accordance with the third aspect, the outputting device is at least one of a voice outputting device, a display device and a portable terminal. Therefore, the outputting device that is to output information can be selected from among outputting devices having differing extents of ease of conveying information.

Further, in a fourth aspect, in the third aspect, in a case in which the outputting device is a display device, the generating section generates information that associates a conveying degree, which expresses ease of conveying information, with each combination of the respective plural vehicle occupants and at least one of sizes of characters and colors of characters displayed by the display device.

In accordance with the fourth aspect, information that associates a conveying degree, which expresses ease of conveying information, with each combination of the respective plural vehicle occupants and at least one of the sizes of characters and the colors of characters that are displayed by the display device, is generated. Accordingly, because an outputting device is selected by using even more combinations, information can be conveyed to a more suitable person.

In a fifth aspect, in the third aspect, in a case in which the outputting device is a voice outputting device, the generating section generates information that associates a conveying degree, which expresses ease of conveying information, with each combination of the respective plural vehicle occupants and volumes of a voice outputted by the voice outputting device.

In accordance with the fifth aspect, information that associates a conveying degree, which expresses ease of conveying information, with each combination of the respective plural vehicle occupants and volumes of the voice outputted by the voice outputting device, is generated. Accordingly, because an outputting device is selected by using even more combinations, information can be conveyed to a more suitable person.

Further, a sixth aspect includes: a deriving section that, on the basis of information that is an object of outputting, derives a conveying degree that expresses an extent to which it is desired to convey the information that is the object of outputting to each of plural persons who exist within a predetermined region; a selecting section that, in accordance with the conveying degrees of the respective persons that have been derived by the deriving section, selects an outputting device that is to output the information that is the object of outputting, from among plural outputting devices that exist within the region; and a control section that carries out control for causing the information, which is the object of outputting, to be outputted from the outputting device selected by the selecting section.

In accordance with the sixth aspect, in the same way as in the first aspect, information can be conveyed to the right person.

In a seventh aspect, a computer executes processing of: on the basis of information that is an object of outputting, deriving a conveying degree that expresses an extent to which it is desired to convey the information that is the object of outputting to each of plural vehicle occupants who exist within a vehicle; in accordance with the derived conveying degrees of the respective vehicle occupants, selecting an outputting device that is to output the information that is the object of outputting, from among plural outputting devices that exist within the vehicle; and carrying out control for causing the information, which is the object of outputting, to be outputted from the selected outputting device.

In accordance with the seventh aspect, in the same way as in the first aspect, information can be conveyed to the right person.

Note that, in an eighth aspect, in the seventh aspect, structure information within the vehicle of the plural outputting devices that exist within the vehicle, which structure information has been transmitted in advance from a control device installed in the vehicle, is received.

In accordance with the eighth aspect, the structures of the plural outputting devices within the vehicle can be grasped.

Further, a ninth aspect causes a computer to execute processing including: on the basis of information that is an object of outputting, deriving a conveying degree that expresses an extent to which it is desired to convey the information that is the object of outputting to each of plural vehicle occupants who exist within a vehicle; in accordance with the derived conveying degrees of the respective vehicle occupants, selecting an outputting device that is to output the information that is the object of outputting, from among plural outputting devices that exist within the vehicle; and carrying out control for causing the information, which is the object of outputting, to be outputted from the selected outputting device.

In accordance with the ninth aspect, in the same way as in the first aspect, information can be conveyed to the right person.

In a tenth aspect, a computer executes processing including: specifying seated positions of plural vehicle occupants within a vehicle; specifying, from among plural outputting devices that are set within the vehicle, an outputting device that is in a vicinity of a vehicle occupant who has made an utterance among the plural vehicle occupants; and effecting control so as to cause a response to the utterance to be outputted from the specified outputting device and not be outputted from other outputting devices.

In accordance with the tenth aspect, the outputting device, which is in a vicinity of the vehicle occupant who has made an utterance among the plural vehicle occupants, is specified from among the plural outputting devices that are set within the vehicle. Control is effected such that a response to the utterance is outputted from the specified outputting device and is not outputted from the other outputting devices. Accordingly, information can be conveyed to the right person.

As described above, in accordance with the present disclosure, the effect that information can be conveyed to the right person is achieved.

BRIEF DESCRIPTION OF THE DRAWINGS

FIG. 3 is a drawing showing an example of a threshold value table relating to the embodiment.

FIG. 4 is a drawing showing an example of a conveying degree table relating to the embodiment.

DETAILED DESCRIPTION

An embodiment for implementing the present disclosure is described in detail hereinafter with reference to the drawings.

Figure 1:
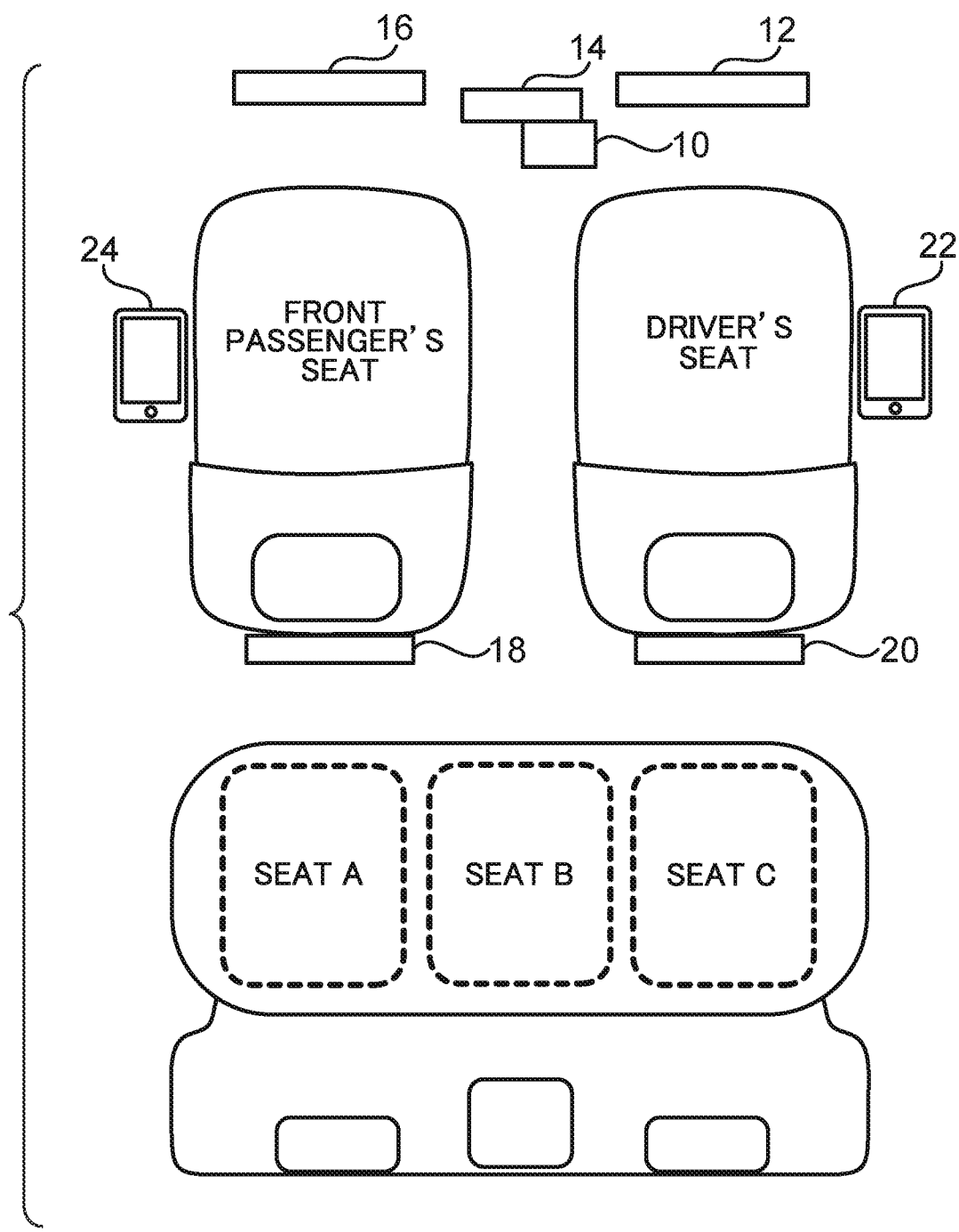
FIG. 1 is a plan view showing an example of the structures within a vehicle relating to an embodiment.

First, the structures within a vehicle relating to the present embodiment are described with reference to FIG. 1. As shown in FIG. 1, an onboard control device 10 and display devices 12, 14, 16, 18, 20 are installed within the vehicle relating to the present embodiment. The onboard control device 10 has a voice outputting section 37 (see FIG. 2) such as a speaker or the like. Further, portable terminals 22, 24 such as smart phones or the like that occupants of the vehicle possess are set within the vehicle. The voice outputting section 37 of the onboard control device 10, the display devices 12, 14, 16, 18, 20, and the portable terminals 22, 24 are examples of outputting devices that output information.

Further, in the following description, in order to differentiate the seating positions of the rear seat, the left side portion of the rear seat is called "seat A", the center portion of the rear seat is called "seat B", and the right side portion of the rear seat is called "seat C". Further, in the following description, in order to differentiate among the occupants of the vehicle, the vehicle occupant who is seated in the driver's seat is called "vehicle occupant D", and the vehicle occupant who is seated in the front passenger's seat is called "vehicle occupant P". Similarly, the vehicle occupant seated in seat A is called "vehicle occupant A", the vehicle occupant seated in seat B is called, "vehicle occupant B", and the vehicle occupant seated in seat C is called "vehicle occupant C". In the present embodiment, a form in which there are five vehicle occupants of the vehicle is described, but the present invention is not limited to this, and there may be four or fewer plural occupants of the vehicle.

The display device 12 is provided at a combination meter that is at the front side of the driver's seat. The display device 16 is provided at the instrument panel at the front side of the front passenger's seat. Further, the onboard control device 10 and the display device 14 are provided at the center console that is in front of the driver's seat and the front passenger's seat and is at the vehicle transverse direction center. The display of a car navigation system is an example of the display device 16.

The display device 18 is provided at the rear surface of the front passenger's seat. The display device 20 is provided at the rear surface of the driver's seat. The portable terminal 22 is disposed at the vehicle transverse direction outer side of the driver's seat. The portable terminal 24 is disposed at the vehicle transverse direction outer side of the front passenger's seat.

Figure 2:
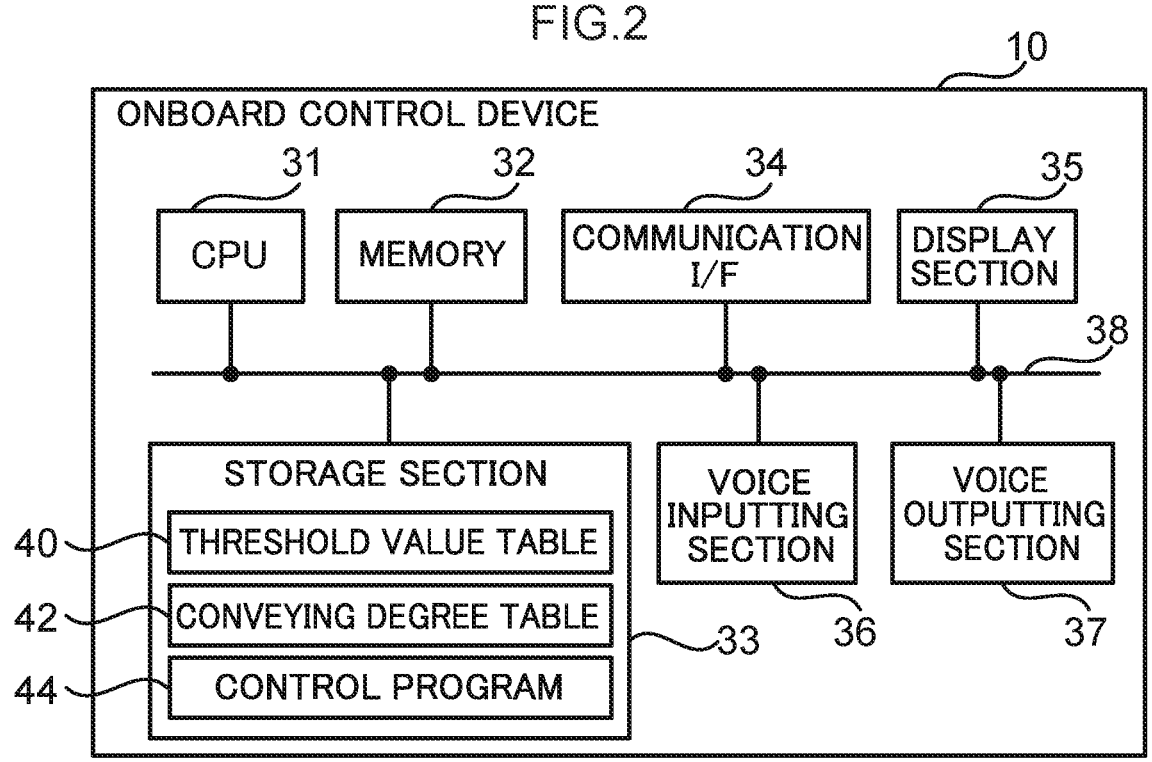
FIG. 2 is a block drawing showing an example of hardware structures of an onboard control device relating to the embodiment.

The hardware structures of the onboard control device 10 are described next with reference to FIG. 2. As shown in FIG. 2, the onboard control device 10 includes a CPU (Central Processing Unit) 31, a memory 32 that serves as a temporary storage region, and a non-volatile storage section 33. Further, the onboard control device 10 includes a communication I/F (InterFace) 34 that is used at the time of carrying out communication with external devices, a display section 35 such as a liquid crystal display or the like, a voice inputting section 36 such as a microphone or the like, and the voice outputting section 37 such as a speaker or the like. The CPU 31, the memory 32, the storage section 33, the communication I/F 34, the display section 35, the voice inputting section 36 and the voice outputting section 37 are connected to a bus 38. Note that an AI (Artificial Intelligence) speaker is an example of the onboard control device 10.

A threshold value table 40, a conveying degree table 42 and a control program 44 are stored in the storage section 33. FIG. 3 shows an example of the threshold value table 40. As shown in FIG. 3, conveying degrees that express the extent to which it is desired to convey information, and threshold values, are stored in association with one another in the threshold value table 40 relating to the present embodiment. In the present embodiment, the higher the conveying degree, the greater the threshold value. The threshold value table 40 is stored in advance in the storage section 33. The number of levels of the conveying degree may be a plural number other than the four levels that are shown in FIG. 3.

An example of the conveying degree table 42 is shown in FIG. 4. As shown in FIG. 4, a numerical value, which expresses the conveying degree that expresses the ease of conveying information, is stored in the conveying degree table 42 relating to the present embodiment for each combination of a vehicle occupant and an information output destination. In the present embodiment, the numerical values that express the conveying degrees that are stored in the conveying degree table 42 are values that are the same as the corresponding threshold values of the threshold value table 40.

Further, "display 1" in FIG. 4 corresponds to the display device 12, "display 2" corresponds to the display device 16, "display 3" corresponds to the display device 14, and "speaker" corresponds to the voice outputting section 37 of the onboard control device 10. Further, "portable terminal 1" in FIG. 4 corresponds to the portable terminal 22, "portable terminal 2" corresponds to the portable terminal 24, "display 4" corresponds to the display device 18, and "display 5" corresponds to the display device 20. For example, the conveying degree table 42 shown in FIG. 4 shows that the information that is displayed on the display device 12 (display 1) is conveyed well to the vehicle occupant D, and is difficult to convey to the vehicle occupant P, and is not conveyed to the vehicle occupants A, B, C. The conveying degree table 42 is generated by a generating section 52 that is described later. Further, the conveying degree table 42 is an example of information that associates the conveying degrees, which express the ease of conveying information, with the respective combinations of the respective plural outputting devices and the respective plural vehicle occupants.

Figure 5:
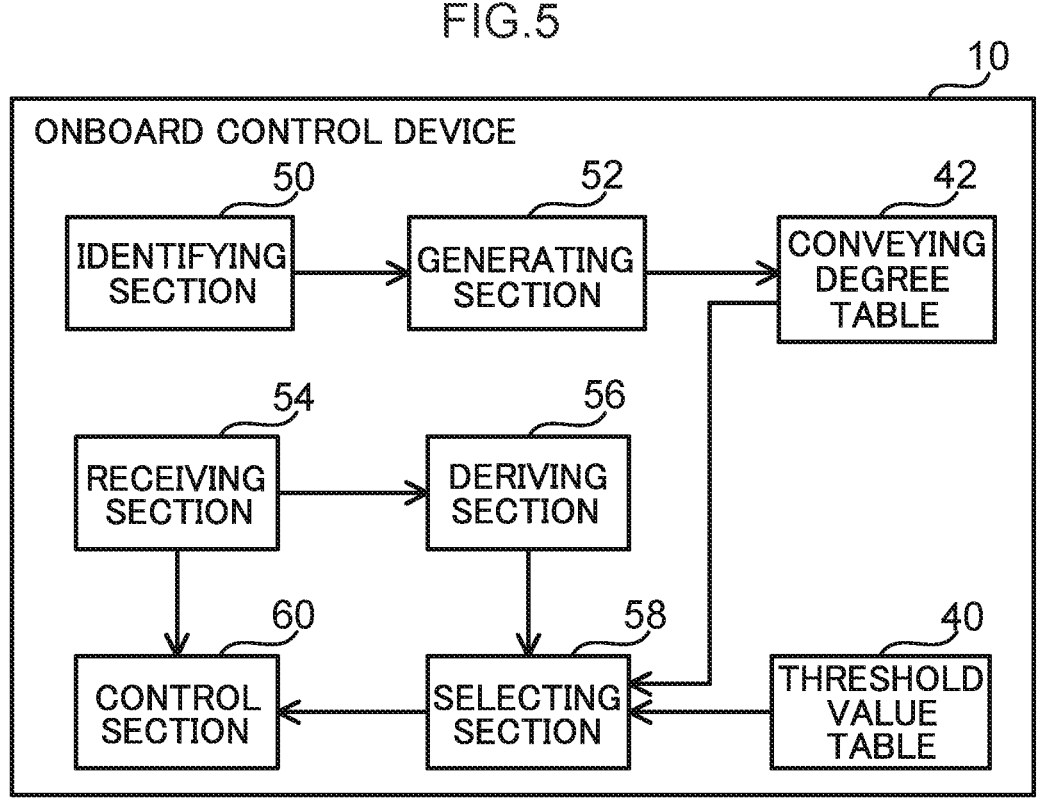
FIG. 5 is a block drawing showing an example of functional structures of the onboard control device relating to the embodiment.

The functional structures of the onboard control device 10 relating to the present embodiment are described next with reference to FIG. 5. As shown in FIG. 5, the onboard control device 10 includes an identifying section 50, the generating section 52, a receiving section 54, a deriving section 56, a selecting section 58, and a control section 60. By executing the control program 44 that is stored in the storage section 33, the CPU 31 functions as the identifying section 50, the generating section 52, the receiving section 54, the deriving section 56, the selecting section 58 and the control section 60 that are shown in FIG. 5.

The identifying section 50 identifies the vehicle occupants who are seated in the respective seats that are the driver's seat, the front passenger's seat, seat A, seat B and seat C. For example, the identifying section 50 identifies the vehicle occupants who are sitting the respective seats by carrying out image analyzing processing, such as processing that detects faces of people or the like, on images that are captured by onboard cameras that are provided within the vehicle. Note that the identifying section 50 may acquire, via the voice inputting section 36, utterances of the vehicle occupants who are within the vehicle, and may identify the vehicle occupants seated in the respective seats on the basis of the voiceprints of the acquired utterances. Further, the vehicle occupants who are seated in the respective seats may be set in advance in the onboard control device 10.

The generating section 52 grasps the petitions of the portable terminals 22, 24 by carrying out wireless communication with the portable terminals 22, 24 via the communication I/F 34. Further, on the basis of the positional relationships between the respective seats and the respective outputting devices that are the voice outputting section 37 of the onboard control device 10, the display devices 12, 14, 16, 18, 20 and the portable terminals 22, 24, the generating section 52 derives conveying degrees that express the ease of conveying information, for each of the combinations of the respective outputting devices and the respective seats. Further, the generating section 52 replaces the respective seats with the vehicle occupants that have been identified by the identifying section 50, and stores the conveying degree for each combination of the respective outputting devices and the respective vehicle occupants in the conveying degree table 42.

The receiving section 54 receives information that is the object of outputting, which information has been generated by an application that runs on the onboard control device 10. An application that reads aloud messages received by a messaging service, an application that reads aloud news or weather reports or the like, and the like are examples of applications that run on the onboard control device 10. Further, an application that conveys the arrival of a birthday that is registered in advance, and the like also are examples of applications that run on the onboard control device 10.

On the basis of the information received by the receiving section 54, the deriving section 56 derives a conveying degree that expresses the extent to which it is desired to convey information to each of the plural vehicle occupants who exist within the vehicle. Note that the conveying degree of each vehicle occupant may be set in advance for each combination of the information that is received by the receiving section 54 and the application that is the source of generation of the information, or may be derived by the deriving section 56 analyzing the contents of the information received by the receiving section 54.

Concretely, for example, in a case in which the information received by the receiving section 54 is a message addressed to vehicle occupant D that has been received by a messaging service, the deriving section 56 derives "definitely want to convey" as the degree of conveying to the vehicle occupant D. Further, in this case, the deriving section 56 derives "do not want to convey" as the degrees of conveying to the vehicle occupants P, A, B, C.

Further, for example, in a case in which the information received by the receiving section 54 is a message that conveys that the day is the birthday of vehicle occupant P, the deriving section 56 derives "do not want to convey" as the degree of conveying to the vehicle occupant P. Further, in this case, the deriving section 56 derives "definitely want to convey" as the degree of conveying to the vehicle occupant D, and derives "do not particularly want to convey" as the degrees of conveying to the vehicle occupants A, B, C. Note that this assumes the conveying of the information to persons carrying out plans to celebrate the birthday of the vehicle occupant P as a surprise.

In accordance with the conveying degrees for each of the vehicle occupants that have been derived by the deriving section 56, and from among the plural outputting devices that exist with the vehicle, the selecting section 58 selects outputting device(s) that is/are to output the information received by the receiving section 54. In the present embodiment, the selecting section 58 refers to the threshold value table 40, and acquires the threshold values that correspond to the conveying degrees of the respective vehicle occupants that have been derived by the deriving section 56. Further, by comparing the numeral value expressing the conveying degree of each of the vehicle occupants of the conveying degree table 42 and the acquired threshold value of each of the vehicle occupants, the selecting section 58 specifies one output destination or a combination of plural output destinations, and thereby selects the outputting device(s). Note that, at this time, in a case in which plural output destinations are combined, the selecting section 58 uses the values of the conveying degrees that are higher. Concretely, for example, with the combination of "display 1" and "display 2", the numerical values expressing the conveying degrees of the information to the (vehicle occupant D, vehicle occupant P, vehicle occupant A, vehicle occupant B, vehicle occupant C) are (4.0, 4.0, 1.0, 1.0, 1.0).

In a case in which the acquired threshold value is a numerical value corresponding to "do not convey" or "difficult to convey", the selecting section 58 selects the outputting device whose numerical value, which expresses the conveying degree of the corresponding vehicle occupant in the conveying degree table 42, is less than or equal to the acquired threshold value. Further, in a case in which the acquired threshold value is a numerical value corresponding to "definitely convey" or "convey", the selecting section 58 selects the outputting device whose numerical value, which expresses the conveying degree of the corresponding vehicle occupant in the conveying degree table 42, is greater than or equal to the acquired threshold value.

Note that, in a case in which the acquired threshold value is a numerical value corresponding to "do not convey", the selecting section 58 may select the outputting device whose numerical value, which expresses the conveying degree of the corresponding vehicle occupant in the conveying degree table 42, is less than or equal to the acquired threshold value. In this case, in a case in which the acquired threshold value is a numerical value corresponding to "definitely convey", "convey" or "difficult to convey", the selecting section 58 selects the outputting device whose numerical value, which expresses the conveying degree of the corresponding vehicle occupant in the conveying degree table 42, is greater than or equal to the acquired threshold value.

The control section 60 carries out control that outputs the information, which was received by the receiving section 54, from the outputting device(s) selected by the selecting section 58. Concretely, in a case in which the display devices 12, 14, 16, 18, 20 are selected by the selecting section 58, the control section 60 carries out control that displays the information received by the receiving section 54 onto the selected display devices 12, 14, 16, 18, 20.

Further, in a case in which the voice outputting section 37 of the onboard control device 10 is selected by the selecting section 58, the control section 60 effects control that outputs the information, which was received by the receiving section 54, by voice from the voice outputting section 37 of the onboard control device 10. Further, in a case in which the portable terminals 22, 24 are selected by the selecting section 58, the control section 60 effects control that notifies the selected portable terminals 22, 24 of the information received by the receiving section 54. Note that this notification may be, for example, notification by email transmission, or notification by a telephone call.

Figure 6:
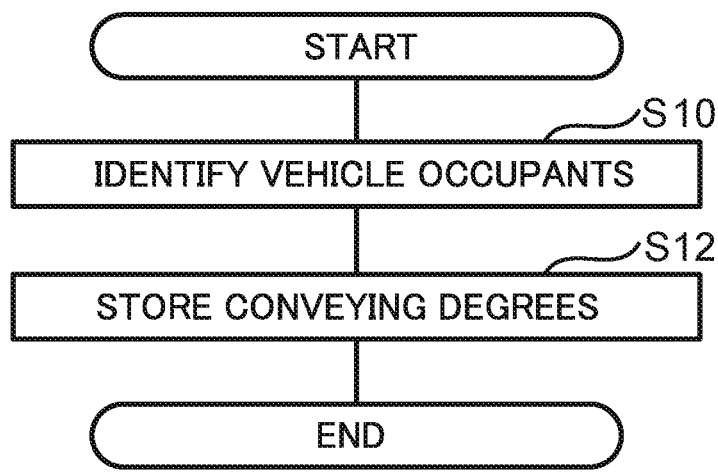
FIG. 6 is a flowchart showing an example of conveying degree table generating processing relating to the embodiment.

Operation of the onboard control device 10 relating to the present embodiment is described next with reference to FIG. 6 and FIG. 7. Note that FIG. 6 is a flowchart showing an example of the flow of conveying degree table generating processing that are executed at the CPU 31 of the onboard control device 10 relating to the present embodiment. Further, in the present embodiment, the conveying degree table generating processing that are shown in FIG. 6 are executed by the CPU 31 executing the control program 44 that is stored in advance in the storage section 33. Further, the conveying degree table generating processing shown in FIG. 6 are executed, for example, in a case in which the ignition switch of the vehicle is turned on, and seating sensors or the like detect that vehicle occupants have sat down in the respective seats of the vehicle.

Figure 7:
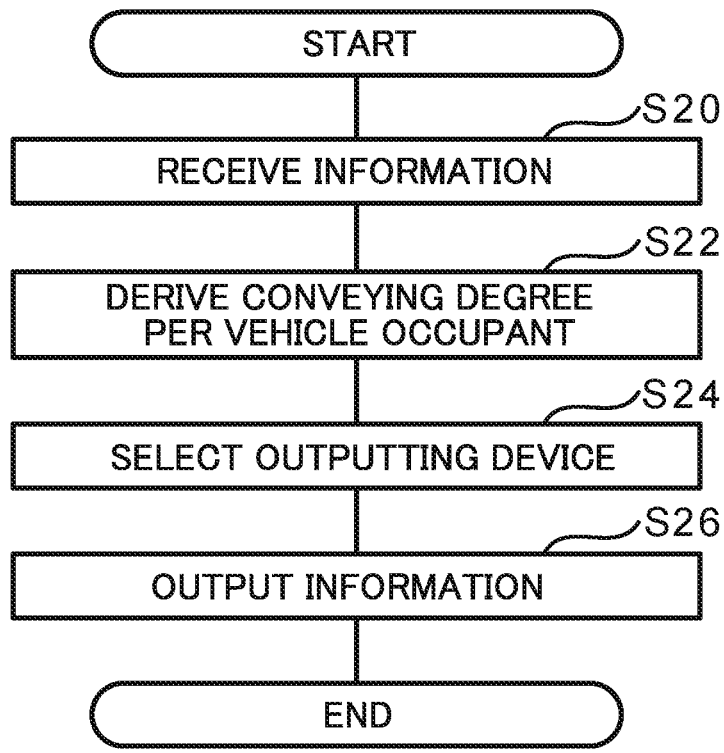
FIG. 7 is a flowchart showing an example of output control processing relating to the embodiment.

FIG. 7 is a flowchart showing an example of the flow of output control processing that are executed by the CPU 31 of the onboard control device 10 relating to the present embodiment. In the present embodiment, the output control processing shown in FIG. 7 are executed due to the CPU 31 executing the control program 44 that is stored in advance in the storage section 33. Further, the output control processing shown in FIG. 7 are executed, for example, in a case in which information that is the object of outputting is generated by an application running on the onboard control device 10.

In step S10 of FIG. 6, as described above, the identifying section 50 identifies the vehicle occupants who are sitting in the respective seats that are the driver's seat, the front passenger's seat, seat A, seat B and seat C.

In step S12, the generating section 52 grasps the positions of the portable terminals 22, 24 by carrying out wireless communication with the portable terminals 22, 24 via the communication I/F 34. Further, on the basis of the positional relationships between the respective seats and the respective outputting devices that are the voice outputting section 37 of the onboard control device 10, the display devices 12, 14, 16, 18, 20 and the portable terminals 22, 24, the generating section 52 derives a conveying degree, which expresses the ease of conveying information, for each combination of the respective outputting devices and the respective seats. Further, the generating section 52 replaces the respective seats with the vehicle occupants that were identified by the processing of step S10, and stores the conveying degree per combination of the respective outputting devices and the respective vehicle occupants in the conveying degree table 42. When the processing of step S12 ends, the conveying degree table generating processing end.

In step S20 of FIG. 7, the receiving section 54 receives information that is the object of outputting and that was generated by an application running on the onboard control device 10. In step S22, as described above, on the basis of the information received by the processing of step S20, the deriving section 56 derives conveying degrees that express the extents to which it is desired to convey the information to the respective plural occupants existing within the vehicle.

In step S24, as described above, in accordance with the conveying degree for each vehicle occupant that were derived by the processing of step S22, the selecting section 58 selects the outputting device(s) that is/are to output the information, from among the plural outputting devices that exist within the vehicle. In step S26, as described above, the control section 60 effects control so as to output the information, which was received by the processing of step S20, from the outputting device(s) selected by the processing of step S24. When the processing of step S26 ends, the output control processing end.

A concrete example of the output control processing is described next. A case is described in which, for example, by the processing of step S22 of the output control processing, "definitely want to convey" is derived as the degree of conveying to vehicle occupant D, and "do not want to convey" is derived as the degrees of conveying to the vehicle occupants P, A, B, C.

In this case, (4.0, 1.0, 1.0, 1.0, 1.0) are acquired as the threshold values of (vehicle occupant D, vehicle occupant P, vehicle occupant A, vehicle occupant B, vehicle occupant C) by the processing of step S24 of the output control processing. In this case, the outputting device is selected at which the numerical values expressing the conveying degrees of the respective vehicle occupants of the conveying degree table 42 of FIG. 4 are greater than or equal to the acquired threshold value for the vehicle occupant D and less than or equal to the acquired threshold values for the vehicle occupants P, A, B, C.

Namely, in this case, "portable terminal 1", at which the numerical values expressing the conveying degrees of the respective vehicle occupants of the conveying degree table 42 of FIG. 4 are (4.0, 1.0, 1.0, 1.0, 1.0), is selected. Accordingly, in this example, information is outputted by the portable terminal 22 by the processing of step S26 of the output control processing.

Next is described a case in which, for example, by the processing of step S22 of the output control processing, "do not want to convey" is derived as the degree of conveying to the vehicle occupant D, and "definitely want to convey" is derived as the degrees of conveying to the vehicle occupants P, A, B, C.

In this case, (1.0, 4.0, 4.0, 4.0, 4.0) are acquired as the threshold values of (vehicle occupant D, vehicle occupant P, vehicle occupant A, vehicle occupant B, vehicle occupant C) by the processing of step S24 of the output control processing. In this case, the outputting device is selected at which the numerical values expressing the conveying degrees of the respective vehicle occupants of the conveying degree table 42 of FIG. 4 are less than or equal to the acquired threshold value for the vehicle occupant D and greater than or equal to the acquired threshold values for the vehicle occupants P, A, B, C.

Namely, in this case, "portable terminal 2", "display 4" and "display 5", at which the numerical values expressing the conveying degrees of the respective vehicle occupants of the conveying degree table 42 of FIG. 4 are (1.0, 4.0, 4.0, 4.0, 4.0), are selected. Accordingly, in this example, information is outputted by the portable terminal 24, the display device 18 and the display device 20 by the processing of step S26 of the output control processing.

As described above, in accordance with the present embodiment, the conveying degree of each vehicle occupant is derived on the basis of the information that is object of outputting, and the outputting device(s), which correspond(s) to the derived conveying degree per vehicle occupant, is/are selected from among the plural outputting devices. Accordingly, information can be conveyed to the right person(s).

Note that the above embodiment describes a case in which the generating section 52 generates the conveying degree table 42. However, the present invention is not limited to this. For example, in a case in which the set positions of all of the outputting devices within the vehicle are fixed, the conveying degree table 42 may be stored in advance in the storage section 33.

Further, in the above-described embodiment, for example, in a case in which the outputting device are display devices, the generating section 52 may derive conveying degrees that express the ease of conveying information, for each combination of the respective plural passengers and at least one of the size of the characters and the color of the characters that the display devices display. Further, for example, in a case in which the outputting devices are voice outputting devices, the generating section 52 may derive conveying degrees that express the ease of conveying information, for each combination of the respective plural passengers and the volumes of voices that the voice outputting devices output.

Figure 8:
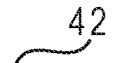
FIG. 8 is a drawing showing an example of a conveying degree table relating to a modified example.

An example of the conveying degree table 42, which associates a conveying degree, which expresses the ease of conveying information, with each combination of the respective plural vehicle occupants and the sizes of characters at the display devices, is shown in FIG. 8. In the example of FIG. 8, conveying degrees, which express the ease of conveying information, also are associated with the respective combinations of the respective plural vehicle occupants and the volumes of voices at the voice outputting devices. FIG. 8 illustrates, as an example, a form in which, at the display devices, the larger the characters, the higher the conveying degree that expresses the ease of conveying information. Further, a form in which, at the voice outputting devices, the greater the volume, the higher the conveying degree that expresses the ease of conveying information, is shown as an example.

The above embodiment describes a case in which the outputting device(s) that is/are to output the information that is the object of outputting is/are selected from among the plural outputting devices that exist within the vehicle, but the present invention is not limited to this. For example, there may be a form in which the outputting device(s) that is/are to output the information that is the object of outputting is/are selected from among plural outputting devices that exist within a predetermined region such as a house, or the like.

Further, there may be a form in which the conveying degree table generating processing and output control processing that are carried out by the CPU 31 of the onboard control device 10 in the above-described embodiment are executed by a computer that is connected to the onboard control device 10 via a network. In this case, the onboard control device 10 transmits, to the computer and via the network, identification information of the vehicle occupants who are seated in the respective seats within the vehicle, and structure information that includes positional information and type information and the like of the respective outputting devices that exist within the vehicle (e.g., information such as the fact that a display device is provided at the rear surface of the front passenger's seat, or the like). Further, in this case, the computer executes the processing of step S12 of the conveying degree table generating processing, and the processing of step S20 through step S26 of the output control processing, by using the identification information of the vehicle occupants and the structure information of the respective outputting devices that have been transmitted from the onboard control device 10. In this case, in step S26, the computer outputs (transmits) the information indicating the selected outputting device, and the information that is the object of outputting, to the onboard control device 10 via the network. Then, the onboard control device 10 carries out control that outputs the information, which is the object of outputting, from the outputting device indicated by the information transmitted from the computer.

Further, in the above-described embodiment, there may be a form in which the onboard control device 10 does not use the threshold value table 40 and the conveying degree table 42. In this case, for example, voice inputting devices such as a microphones or the like are respectively provided in the vicinities of the respective seats within the vehicle. Note that, in a case in which outputting devices that have voice inputting sections, such as smart phones or AI speakers or the like, are provided in vicinities of the respective seats within the vehicle, the voice inputting sections of these outputting devices may be used.

Further, in this case, by using images that have been captured by onboard cameras provided within the vehicle, the onboard control device 10 identifies the vehicle occupants who are seated in the respective seats that are the driver's seat, the front passenger's seat, seat A, seat B and seat C, and specifies the seated positions of the respective vehicle occupants. Further, in this case, when an utterance is made by a given vehicle occupant, the onboard control device 10 specifies, among the voice inputting devices to which the voice corresponding to that utterance was inputted, the seat corresponding to the voice inputting device at which the voice having the greatest volume was inputted, as the seating position of the vehicle occupant who made the utterance. Then, in this case, on the basis of the specified seating position of the vehicle occupant, and the set positions of the plural outputting devices that exist within the vehicle, the onboard control device 10 specifies, from among the plural outputting devices, the outputting device that is in the vicinity of the vehicle occupant who made the utterance (e.g., the outputting device that is at the position closest to the vehicle occupant who made the utterance). Then, the onboard control device 10 effects control so as to output, from the specified outputting device, a response to the utterance, and so as to not output the response from the other outputting devices. Note that a question such as, for example, "How's the weather today?" is an example of the utterance in this case, and a reply such as, for example, "Sunny" is an example of the response to this utterance.

Further, description has been given of a case in which the conveying degree table generating processing and the output control processing that are carried out by the CPU 31 in the above-described embodiment are software processing that are carried out by the execution of programs, but these may be processing that are carried out by hardware. Further, the conveying degree table generating processing and the output control processing may be processing that are carried out by combining both hardware and software. Moreover, the control program 44 that is stored in the storage section 33 may be stored on any of various types of storage media and distributed.

The present disclosure is not limited to the above-described embodiment, and, other than the above, can of course be implemented by being modified in various ways within a scope that does not depart from the gist thereof.

What is claimed is:

1. An onboard control device comprising:
a processor that is configured to execute a processing, the processing including:
on the basis of information that is an object of outputting, deriving a conveying degree that expresses an extent to which it is desired to convey the information that is the object of outputting to each of a plurality of vehicle occupants who exist within a vehicle;
on the basis of positional relationships between a plurality of outputting devices and the plurality of vehicle occupants, generating association information that associates the conveying degree with at least one of sizes of characters and colors of characters of the respective outputting devices and the respective vehicle occupants;
based on the derived conveying degrees of each of the vehicle occupants and the association information, selecting an outputting device that is to output the information that is the object of outputting, from among the plurality of outputting devices that exist within the vehicle; and
carrying out control for causing the information that is the object of outputting to be outputted from the selected outputting device.

2. The onboard control device of claim 1, wherein the outputting device is at least one of a voice outputting device that is installed in the vehicle, a display device that is installed in the vehicle, and a portable terminal that a vehicle occupant of the vehicle possesses.

3. The onboard control device of claim 2, wherein the conveying degree expresses ease of conveying information, and the outputting device is a display device.

4. The onboard control device of claim 2, wherein the conveying degree expresses ease of conveying information, and, the outputting device is a voice outputting device, the processor generates the association information that associates the conveying degree, which expresses ease of conveying information, with each combination of the respective vehicle occupants and volumes of a voice outputted by the voice outputting device.

5. A control method wherein a computer executes processing of:
on the basis of information that is an object of outputting, deriving a conveying degree that expresses an extent to which it is desired to convey the information that is the object of outputting to each of a plurality of vehicle occupants who exist within a vehicle;

on the basis of positional relationships between a plurality of outputting devices and the plurality of vehicle occupants, generating association information that associates the conveying degree with at least one of sizes of characters and colors of characters of the respective outputting devices and the respective vehicle occupants;

based on the derived conveying degrees of the respective vehicle occupants and the association information, selecting an outputting device that is to output the information that is the object of outputting, from among the plurality of outputting devices that exist within the vehicle; and carrying out control for causing the information that is the object of outputting to be outputted from the selected outputting device.

6. The control method of claim 5, wherein structure information within the vehicle of the plurality of outputting devices that exist within the vehicle, which structure information has been transmitted in advance from a control device installed in the vehicle, is received.

7. A non-transitory computer-readable storage medium storing a control program for causing a computer to execute processing comprising:

on the basis of information that is an object of outputting, deriving a conveying degree that expresses an extent to which it is desired to convey the information that is the object of outputting to each of a plurality of vehicle occupants who exist within a vehicle;

on the basis of positional relationships between a plurality of outputting devices and the plurality of vehicle occupants, generating association information that associates the conveying degree with at least one of sizes of characters and colors of characters of the respective outputting devices and the respective vehicle occupants;

based on the derived conveying degrees of the respective vehicle occupants and the association information, selecting an outputting device that is to output the information that is the object of outputting, from among the plurality of outputting devices that exist within the vehicle; and carrying out control for causing the information that is the object of outputting to be outputted from the selected outputting device.

* * * * *

UNITED STATES PATENT AND TRADEMARK OFFICE
CERTIFICATE OF CORRECTION

PATENT NO. : 10,902,857 B2
APPLICATION NO. : 16/222128
DATED : January 26, 2021
INVENTOR(S) : Masaki Tsukamoto et al.

It is certified that error appears in the above-identified patent and that said Letters Patent is hereby corrected as shown below:

In the Specification

In Column 6, Line(s) 41, delete "petitions" and insert --positions--, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*